UNITED STATES PATENT OFFICE.

HERBERT E. DENNETT, OF BOSTON, MASSACHUSETTS.

FOOD COMPOUND.

SPECIFICATION forming part of Letters Patent No. 417,710, dated December 24, 1889.

Application filed September 22, 1884. Serial No. 143,724. (No specimens.)

*To all whom it may concern:*

Be it known that I, HERBERT E. DENNETT, a citizen of the United States, residing at Boston, in the county of Suffolk and State of Massachusetts, have invented certain new and useful Improvements in Food Compounds; and I do declare the following to be a full, clear, and exact description of the invention, such as will enable others skilled in the art to which it appertains to make and use the same.

My invention relates to an improved food compound, in which animal, mineral, and vegetable matter is combined, in the form of ground bone and the germs of any of the cereals or of other nutritious vegetables.

In preparing my compound I prefer to use the germinal portion of wheat, which is thoroughly dried by steam, so as to be almost cooked, then ground and mixed with an equal, or nearly equal, quantity of granulated dry raw beef-bone. This compound is intended to be incorporated in soups and various other kinds of food as required, and it may also be combined with spices, pepper, salt, and other condiments, or may be used alone as such.

The wheat germs, or the germs of other cereals, as the case may be, are taken from the grain by the roller process of milling. These germs are dried or nearly cooked by steam heat applied in any suitable manner; or they may be malted, if desired, and the dried germs are then ground or granulated.

The bones employed in the preparation of my compound are taken from healthy animals, suitable for food, uncooked beef-bones being preferred. These bones are dried quickly, without allowing them to decompose or undergo any chemical alteration, and they are then ground to a fine powder. Equal parts of the granulated steam-cooked grain and the ground raw bone are then combined by thorough mixing, the compound being thus ready for use without further treatment.

This compound may be added to soups, gravies, bread, cakes, confectionery, and other articles of food with satisfactory results, and will be found to supply in a palatable form the necessary elements of bone, dental, and nerve tissue in which food as ordinarily prepared is so often deficient.

This compound can be used with excellent effect in various forms of disease consequent on defective or improper nourishment, especially in children. Under its use decay of the teeth will be arrested or prevented, the bony structures of the body strengthened, and a healthy condition of the nervous system induced. The compound will also assist digestion and assimilation, and thereby promote the health of the body generally.

Having thus described my invention, what I claim as new, and desire to secure by Letters Patent, is—

As a new article of manufacture, the herein-described food compound, composed of the granulated steam-dried germs of cereals and dry beef-bones granulated while in a healthy state without cooking, said dry bones and granulated grain being thoroughly combined by mixing in equal parts, substantially as specified.

In testimony whereof I affix my signature in presence of two witnesses.

HERBERT E. DENNETT.

Witnesses:
WILLIAM H. H. TUTTLE,
DARWIN G. WARE.